UNITED STATES PATENT OFFICE.

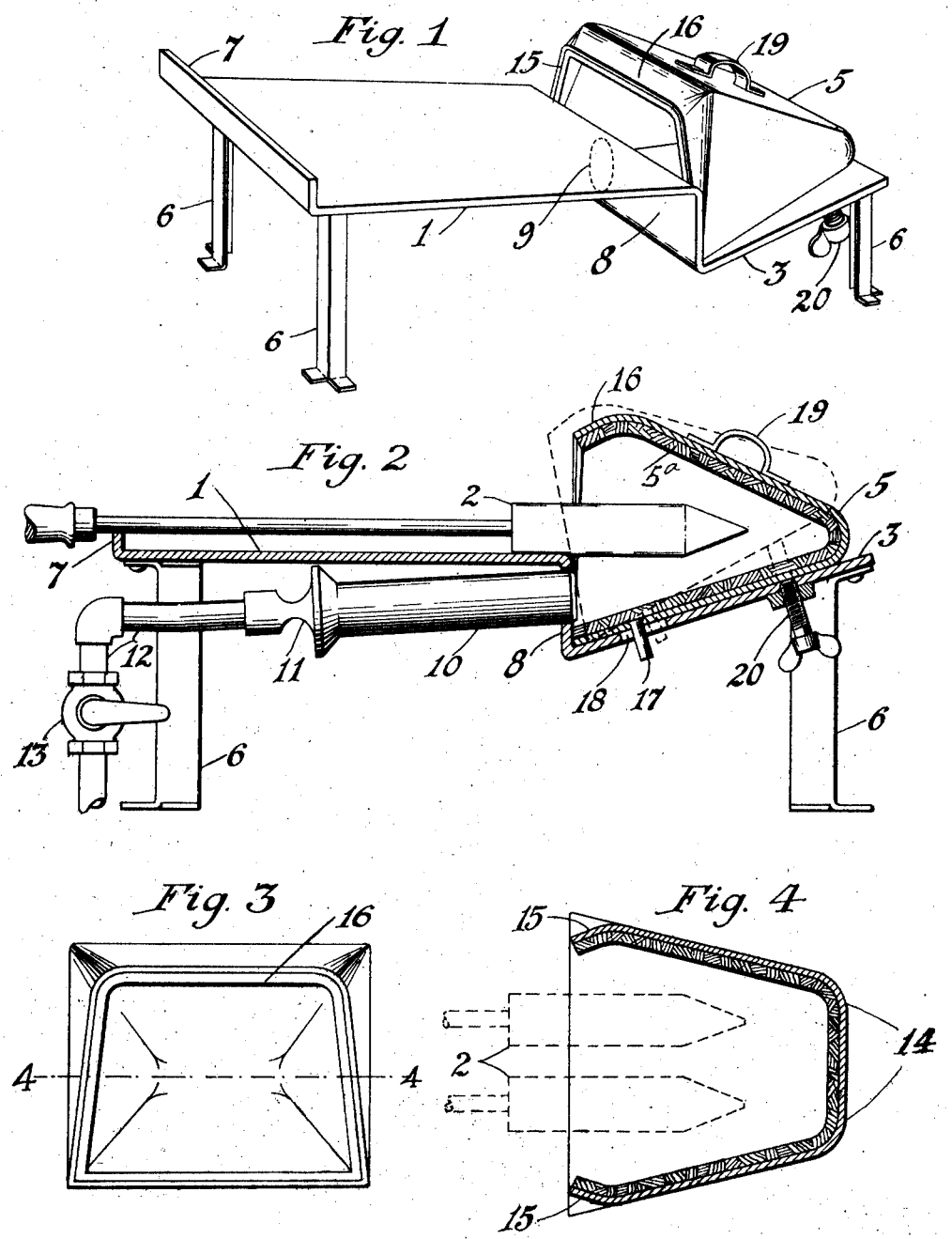

JAMES BLAKE, OF BUFFALO, NEW YORK.

SOLDERING-FURNACE.

1,401,514.   Specification of Letters Patent.   Patented Dec. 27, 1921.

Application filed March 12, 1919. Serial No. 282,244.

*To all whom it may concern:*

Be it known that I, JAMES BLAKE, a subject of the King of England, residing at Buffalo, in the county of Erie and State of New York, have invented new and useful Improvements in Soldering-Furnaces, of which the following is a specification.

This invention relates to the furnaces used by tinners for heating soldering irons, lead-melting pots, &c., and more particularly to furnaces of this kind which are heated by gas or vapor.

One object of the invention is the improvement of the flame-chamber or hood of the device which receives the soldering iron or irons, with a view of utilizing the flame to the fullest extent and heating the irons in a comparatively short time.

Further objects are to adapt the hood to irons of different dimensions, and to improve the construction of the stand or table of the furnace.

In the accompanying drawings:

Figure 1 is a perspective view of a soldering furnace embodying the invention. Fig. 2 is a longitudinal section thereof. Fig. 3 is a front view of the hood. Fig. 4 is a substantially horizontal section thereof on line 4—4 of Fig. 3.

Similar characters of reference indicate corresponding parts throughout the several views.

The stand of the furnace may be of any appropriate construction, but preferably comprises a substantially horizontal front table or platform 1 for supporting the soldering iron or irons 2, and a forwardly-inclined rear platform 3 adapted to support the hood or flame-chamber 5 of the furnace. These platforms are preferably constructed of a single plate of sheet steel mounted on legs 6. At its front edge the table 1 may be provided with an upturned flange or saddle 7 upon which the shanks of the soldering irons rest, so as to hold the irons in the proper position in the hood. Two irons are usually placed side by side, as shown by dotted lines in Fig. 4.

The front portion of the sloping platform 3 is depressed or dropped below the front platform and joined thereto by an offset or vertical wall 8. This wall has a central opening 9 for the passage of a suitable gas or vapor burner 10 arranged underneath the front platform. The burner has the customary air inlet or mixer 11, and is supplied by a pipe 12 having a hand valve 13.

The hood is open at its front end and closed at its rear end, and is lined with a suitable refractory material $5^a$ such as asbestos.

In its preferred form illustrated in the drawings, the hood is tapered toward its closed end, both vertically and horizontally and its bottom is inclined to conform to the rear platform 3. The rear corners of the hood are rounded in a horizontal plane, as shown at 14, to facilitate the deflection of the burner-flame toward the mouth of the hood and cause it to return along the outer sides of the soldering irons. As shown in Fig. 4, the front portions 15 of the side walls of the hood are bent inwardly or converged toward its mouth, whereby the reverberating flame is deflected toward the longitudinal center line of the hood and again reversed toward its rear end. The front portion 16 of the hood-top is depressed or inclined forwardly, to direct the upper part of the returning flame downwardly upon and between the soldering irons, instead of allowing it to shoot forwardly out of the hood.

By this construction of the hood, the flame is directed against all parts of the soldering irons, both in a vertical direction, due to the rearwardly converging top and bottom of the hood and its downwardly bent front portion 16, and in a substantially horizontal direction, due to the forwardly-converging portions 15 of its side walls. The result is that the irons are completely enveloped, the flame is utilized to the maximum extent and the proper heating of the irons is greatly expedited. At the same time undue heating of the shanks or handles of the irons is avoided.

The hood may rest loosely on the stand and is preferably provided on its bottom with a pin or projection 17 arranged in an opening 18 in the platform 3, to hold the hood against lateral and rearward displacement, the offset or shoulder 8 holding it from forward displacement. It may also be provided with a handle 19 for conveniently carrying it.

Soldering irons vary in size, according to the nature of the work to be done, and in order to concentrate the flame upon small as well as large irons, the hood is made adjustable, so that the inclined upper part 16 of its mouth may be placed at a greater or less angle, the angle being increased for small irons, as indicated by dotted lines in Fig. 2, while for the larger irons the hood may be left in the position shown by full lines in said figure. In the construction shown in the drawings, this adjustment is effected by tilting the hood forwardly more or less by an adjusting screw 20, as shown by dotted lines in Fig. 2. This screw passes through a threaded opening in the platform 3 and bears against the bottom of the hood between its middle and its rear end. The opening 18 is elongated lengthwise of the hood, or otherwise made large enough to permit of this tilting action of the hood. If desired, any other suitable means may be employed for adjusting the hood.

I claim as my invention:

1. In a soldering furnace, a flame-hood open at at its front end and closed at its rear end and having inclined top and bottom walls converging rearwardly, the front portion of its top wall being inclined forwardly to deflect the flame downwardly and the front portions of its side walls converging toward its open end to direct the flame toward the center of the hood.

2. In a soldering furnace, the combination of a stand having a support for a soldering iron, a flame-hood tiltably mounted on the stand, the open front end of the hood having a forwardly-inclined top-portion, and adjusting means for tilting the hood forwardly on said stand to change the angle of said inclined top-portion.

3. In a soldering furnace, the combination of a stand having a support for a soldering iron and a second support adjacent to the first-named support and having a portion depressed below it and inclined toward it, a tiltable flame-hood having an inclined bottom resting on said inclined support, the front end of the hood being open to receive the soldering iron, and means for adjusting the rear portion of the hood.

4. In a soldering furnace, the combination of a stand having a support for a soldering iron and a second support adjacent to the first-named support and having a portion depressed below it, a flame-hood tiltably mounted on the second-named support and open at its front end to receive the soldering iron, and adjusting means for tilting the hood, said second-named support having an opening and the hood having a projection engaging said opening.

5. In a soldering furnace, the combination of a stand having a substantially horizontal front platform for a soldering iron and a rear platform sloping toward the front platform and connected therewith by a substantially upright wall having an opening, a flame-hood resting on said inclined platform and open at its front end to receive the soldering iron, and a burner passing through the opening of said wall to deliver the flame into the hood.

JAMES BLAKE.